US011756321B2

(12) United States Patent  
Tatsumi et al.

(10) Patent No.: US 11,756,321 B2  
(45) Date of Patent: Sep. 12, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Daisuke Tatsumi, Kanagawa (JP); Manabu Ueda, Kanagawa (JP); Akane Abe, Kanagawa (JP); Jun Ando, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 37 days.

(21) Appl. No.: 17/324,099

(22) Filed: May 18, 2021

(65) Prior Publication Data

US 2022/0188543 A1 Jun. 16, 2022

(30) Foreign Application Priority Data

Dec. 16, 2020 (JP) .................................. 2020-208692

(51) Int. Cl.
*G06V 30/19* (2022.01)
*G06F 18/21* (2023.01)
*G06V 30/41* (2022.01)

(52) U.S. Cl.
CPC ...... *G06V 30/19013* (2022.01); *G06F 18/217* (2023.01); *G06V 30/41* (2022.01)

(58) Field of Classification Search
CPC ...... G06K 9/6262; G06V 30/40; G06V 30/10; G06V 30/41; G06V 10/70
See application file for complete search history.

(56) References Cited

U.S. PATENT DOCUMENTS

| | | | | |
|---|---|---|---|---|
| 2004/0213444 | A1* | 10/2004 | Yamamichi | G06T 5/50 382/128 |
| 2019/0065451 | A1* | 2/2019 | Miyamoto | G06F 40/166 |
| 2019/0166104 | A1* | 5/2019 | Zargarian | G06F 21/602 |
| 2020/0273078 | A1* | 8/2020 | Xu | G06Q 30/04 |
| 2020/0372249 | A1* | 11/2020 | Iwamura | G06V 30/416 |
| 2020/0380286 | A1* | 12/2020 | Li | G06V 10/82 |

(Continued)

FOREIGN PATENT DOCUMENTS

| | | |
|---|---|---|
| JP | 2004199529 | 7/2004 |
| JP | 4566510 | 10/2010 |
| JP | 2011-248609 | 12/2011 |

(Continued)

*Primary Examiner* — King Y Poon
*Assistant Examiner* — Michael L Burleson
(74) *Attorney, Agent, or Firm* — JCIPRNET

(57) ABSTRACT

An information processing apparatus includes a processor configured to: acquire, from results of character recognition performed on a target image including character strings, attribute information indicating an attribute to which a key character string and a value character string belong, the key character string as a character string specified beforehand as a key and the value character string as a character string indicating a value corresponding to the key character string; acquire by using the attribute information the key character string corresponding to the value character string extracted from the results of the character recognition; and output the key character string and the value character string corresponding to the key character string.

15 Claims, 7 Drawing Sheets

(56) References Cited

U.S. PATENT DOCUMENTS

2021/0012138 A1\* 1/2021 Kondoh ............... G06V 30/127
2021/0089804 A1\* 3/2021 Uejo .................... G06V 30/416

FOREIGN PATENT DOCUMENTS

| JP | 5621169 | 11/2014 |
| JP | 2015-052864 | 3/2015 |
| JP | 6109688 | 4/2017 |
| JP | 2018-073203 | 5/2018 |
| JP | 6616269 | 12/2019 |

\* cited by examiner

FIG. 4

| CHARACTER STRING | ATTRIBUTE | TYPE | POSITION | |
|---|---|---|---|---|
| | | | X DIRECTION | Y DIRECTION |
| APPLICATION DATE | DATE | Key | 3 | 10 |
| MONTH, DAY, YEAR | DATE | Value | 10 | 10 |
| APPLICANT NAME | NAME | Key | 3 | 11 |
| TARO FUJI | NAME | Value | 10 | 11 |
| ⋮ | ⋮ | ⋮ | ⋮ | ⋮ |

FIG. 5

| ATTRIBUTE | KEY NAME | POSITIONAL RELATIONSHIP |
|---|---|---|
| DATE | APPLICATION DATE | K-RIGHT-V |
| NAME | APPLICANT NAME | K-RIGHT-V |
| ADDRESS | APPLICANT ADDRESS | K-RIGHT-V |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-208692 filed Dec. 16, 2020.

BACKGROUND

(i) Technical Field

The present disclosure relates to an information processing apparatus and a non-transitory computer readable medium.

(ii) Related Art

Japanese Patent No. 5621169 discloses a form recognition apparatus that reads a read-target character string from a form group including a variety of layouts and determines an attribute of the character string without any definition of a form. The form recognition apparatus includes a character string detection unit, character string recognition unit, item-name likelihood calculation unit, item value likelihood calculation unit, placement likelihood calculation unit, item-name to item-value relation evaluation value calculation unit, and item-name to item-value relation determination unit. The character string detection unit detects a character string region from a form image. The character string recognition unit recognizes individual characters in the character string region. The item name likelihood calculation unit calculates an item name likelihood representing a probability of a character string being an item name in the form image. The item value likelihood calculation unit calculates an item value likelihood representing a probability of a character string in the form image matching grammatical and notation rules of a word or a character string registered in a representation dictionary. The placement likelihood calculation unit calculates a placement likelihood. The placement likelihood indicates whether a placement of a pair of character strings in the form image is appropriate in an item-name to item-value relationship in terms of a character string frame of the character string pair or a character string rectangle. The item-name to item-value relation evaluation value calculation unit calculates an evaluation value that represents a likelihood of the character string pair as an item name to item value in accordance with the item name likelihood, item value likelihood, and placement likelihood. The item-name to item-value relation determination unit determines association of an item-name to item-value relation in the form image in response to the evaluation value output by the item-name to item value-relation evaluation value calculation unit.

Japanese Patent No. 6616269 discloses a technique that causes a computer of a form processing apparatus to function as elements described below. The elements include an image reading unit, character string recognition unit, same-row character string group information acquisition unit, specific character string determination unit, specific image determination unit, and content item acquisition unit. The image reading unit acquires a form image by causing an image reading apparatus to reach the form. The character string recognition unit recognizes a character string by performing a character recognition operation on the form image acquired by the image reading unit. The same-row character string group information acquisition unit acquires same-row character string group information about a character string group at the same row from among character strings recognized by the character string recognition unit. The specific character string determination unit determines whether a predetermined character string is included in each piece of the same-row character sting group information acquired by the same-row character string group information acquisition unit. The specific image determination unit determines whether a predetermined specific image is present in the vicinity of the same-row character string group information that is determined as including the specific character string by the specific character string determination unit. If the specific image determination unit has determined that the specific image is present, the content item acquisition unit acquires as a specific content item described in the form an item character string included in the same-row character string group information in the vicinity of the specific image.

Techniques of extracting a character string included in an image by performing an optical character recognition (OCR) operation on the mage read from a document are available. To extract a character string from an image through the OCR operation, key value extraction may be performed to extract a character string having a value (hereinafter referred to as a value character string) corresponding to a character string specified beforehand as a key (hereinafter referred to as a key character string).

In the key value extraction via the OCR operation, the value character string may be extracted from results of the OCR operation. However, a key character string may be difficult to extract because of possible erratic recognition or because the key character string corresponding to the value character string may not be included in a document. In such a case, the key character string and the value character string are difficult to output.

SUMMARY

Aspects of non-limiting embodiments of the present disclosure relate to providing an information processing apparatus and a non-transitory computer readable medium outputting a key character string and a value character string even when the key character string is difficult to extract via the OCR operation or the key character string corresponding to the value character string is not included in a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire, from results of character recognition performed on a target image including character strings, attribute information indicating an attribute to which a key character string and a value character string belong, the key character string as a character string specified beforehand as a key and the value character string as a character string indicating a value corresponding to the key character string; acquire by using the attribute information the key character string corresponding to the value character string extracted from the results of the character recognition;

and output the key character string and the value character string corresponding to the key character string.

BRIEF DESCRIPTION OF THE DRAWINGS

Exemplary embodiments of the present disclosure will be described in detail based on the following figures, wherein:

FIG. 4 illustrates a recognition result example of each of the exemplary embodiments;

FIG. 5 illustrates an example of a positional relationship database of each of the exemplary embodiments;

DETAILED DESCRIPTION

First Exemplary Embodiment

First exemplary embodiment of the disclosure is described below with reference to the drawings.

Figure 1:
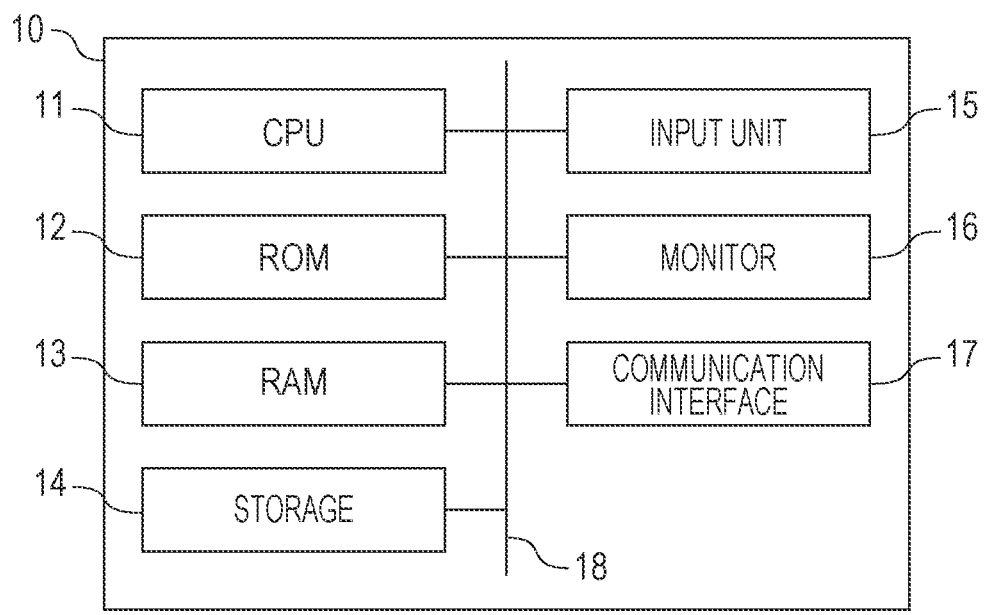
FIG. 1 is a block diagram illustrating a hardware configuration example of an information processing apparatus of each exemplary embodiment.

A configuration of an information processing apparatus 10 is described with reference to FIG. 1. FIG. 1 is a block diagram illustrating a hardware configuration example of the information processing apparatus 10 of a first exemplary embodiment. For example, the information processing apparatus 10 of the first exemplary embodiment includes but is not limited to a terminal, such as a personal computer, or a server. The information processing apparatus 10 may be built in another apparatus, such as an image forming apparatus.

Referring to FIG. 1, the configuration of the information processing apparatus 10 includes a central processing unit (CPU) 11, read-only memory (ROM) 12, random-access memory (RAM) 13, storage 14, input unit 15, monitor 16, and communication interface (I/F) 17. The CPU 11, ROM 12, RAM 13, storage 14, input unit 15, monitor 16, and communication I/F 17 are interconnected to each other via a bus 18. The CPU 11 is an example of processor.

The CPU 11 controls the whole of the information processing apparatus 10. The ROM 12 stores a variety of programs, including an information processing program, and data used in the first exemplary embodiment. The RAM 13 is a memory used as a work area when the variety of programs are executed. The CPU 11 extracts a character string by expanding the program from the ROM 12 onto the RAM 13 and executing the program. For example, the storage 14 is a hard disk drive (HDD), solid-state drive (SSD), or flash memory. The information processing program may also be stored on the storage 14. The input unit 15 includes a mouse and keyboard receiving input characters. For example, the monitor 16 displays an extracted character. The communication I/F 17 transmits or receives data.

Figure 2:
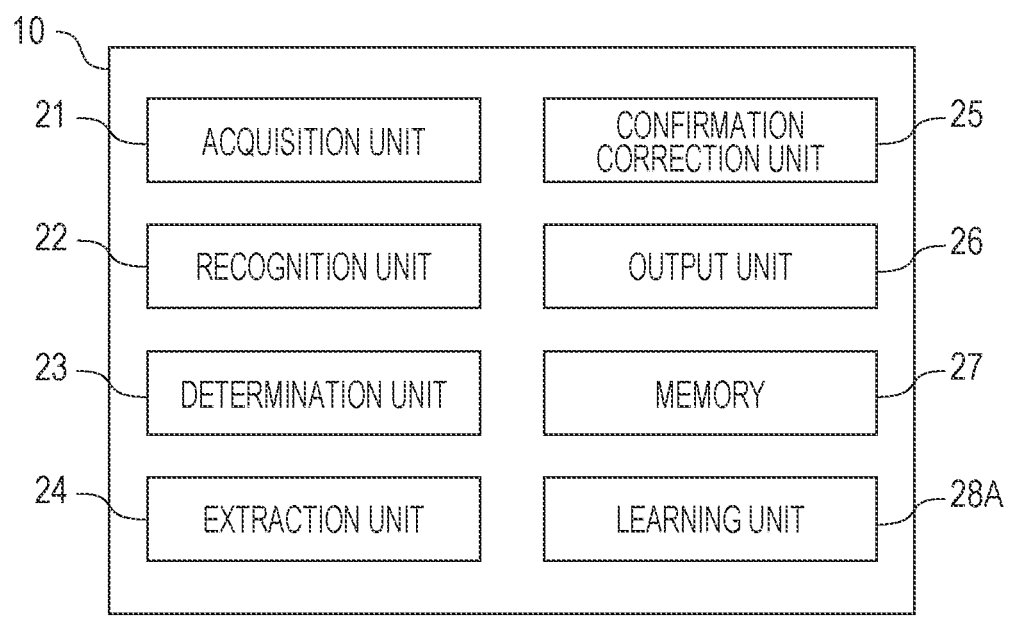
FIG. 2 is a block diagram illustrating a functional configuration example of the information processing apparatus of a first exemplary embodiment.

Referring to FIG. 2, the functional configuration of the information processing apparatus 10 is described. FIG. 2 is a block diagram illustrating a functional configuration example of the information processing apparatus 10 of the first exemplary embodiment.

Referring to FIG. 2, the information processing apparatus 10 includes an acquisition unit 21, recognition unit 22, determination unit 23, extraction unit 24, confirmation correction unit 25, output unit 26, memory 27 and learning unit 28A. When the CPU 11 executes the information processing program, the information processing apparatus 10 functions as the acquisition unit 21, recognition unit 22, determination unit 23, extraction unit 24, confirmation correction unit 25, output unit 26, memory 27 and learning unit 28A.

Figure 3:
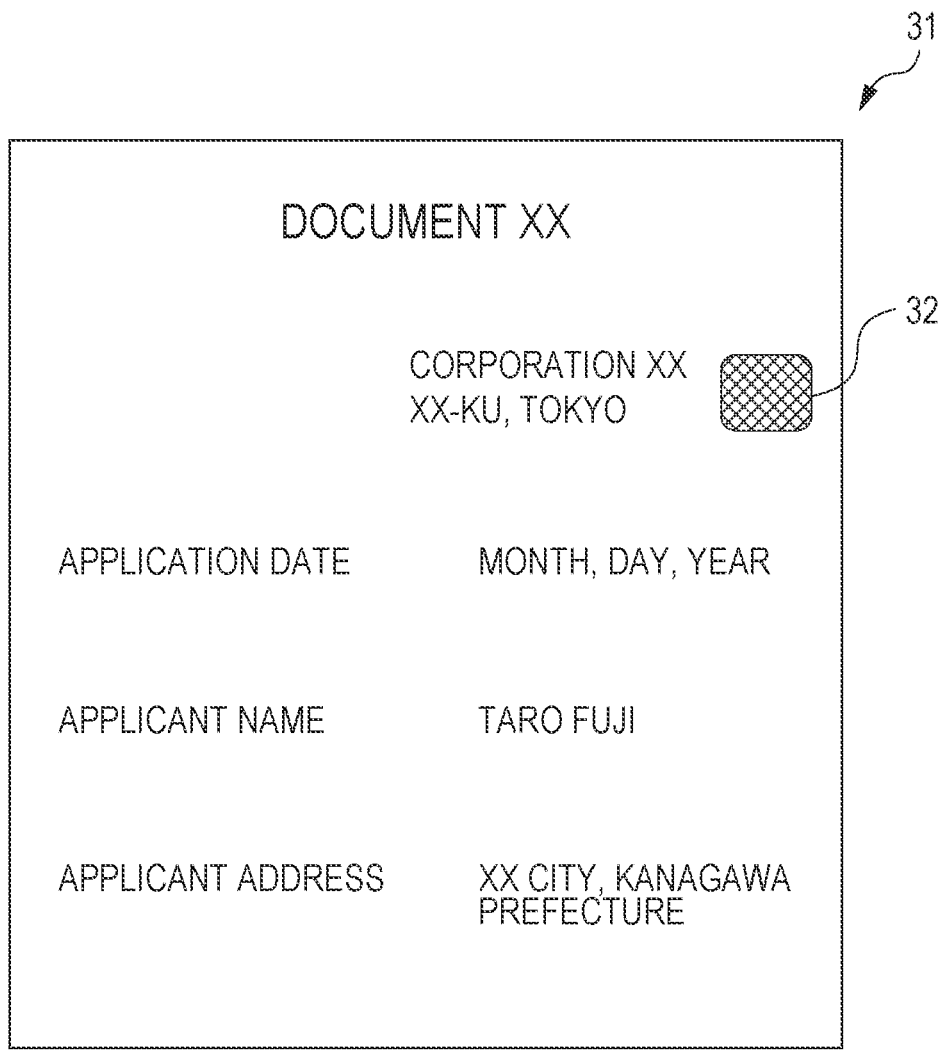
FIG. 3 illustrates a target image example from which a character string is extracted in accordance with each of the exemplary embodiments.

The acquisition unit 21 acquires an image 31 serving as a target (hereinafter referred to as a target image 31) from which a character string is extracted. Referring to FIG. 3, the target image 31 of the first exemplary embodiment is the image of a document that includes but is not limited to an entry item, a character string written by a user for the entry item, and an object 32, such as an imprint. The target image 31 may be an image of a form or a slip delineated by ruled lines, a mechanically printed receipt, or any other image as long as it includes a character string. The object 32 may now be positioned at a location that is predetermined depending on the type of the document.

Via the optical character recognition (OCR) operation, the recognition unit 22 acquires from the target image 31 a character string and the object 32 included in the document and positions (coordinates) of the character string and the object 32 in the target image 31 and outputs these pieces of information as recognition results 33.

Referring to FIG. 4, for example, the recognition results 33 of the first exemplary embodiment include the character string and the object 32 acquired from the target image 31 and the attribute, type, and position (coordinates) of each of the character string and the object 32. For example, the attribute of each character string in the recognition results 33 refers to information, such as "date" and "address" indicating the attribute to which the character string belongs (hereinafter referred to as "attribute information"). The type refers the type of a character string representing a specified key (hereinafter referred to as a "key character string") or the type of a character string representing a value corresponding to the key character string (hereinafter referred to as a "value character string").

According to the first exemplary embodiment, the recognition unit 22 recognizes a character string included in the target image 31. Alternatively, the recognition unit 22 may analyzes the target image 31 to identify the type of the document and output recognition results. For example, in the analysis, a specific character string and a position of a ruled line are recognized and the recognition results are compared with pre-stored feature of documents to identify the type. Alternatively, an identifier identifying a document in the target image 31 may be recognized to identify the type of the document. By causing the type of the document to be identified, the key character string included in each document may be identified. Specifically, the recognition unit 22 may identify a character string to be extracted by identifying the type of the document.

The determination unit 23 determines the attribute information of each character string in the recognition results 33 and the type of the character string in the recognition results 33. The determination unit 23 outputs the attribute determined on each character string and the type of the character string to the recognition results 33. The determination unit 23 is a learning model that has learned to determine the attribute and type of the character string. For example, the determination unit 23 may be recurrent neural network (RNN) and support vector machine (SVM). The determination unit 23 learns beforehand the character string, attribute of the character string, and type of the character string, determines the attribute and type of the character string using the character string output by the recognition unit 22, and outputs determination results to the recognition results 33.

The determination unit 23 of the first exemplary embodiment described above is the learning model that has learned to determine the attribute and type of the character string. The disclosure is not limited to this method. For example, the attribute and type of the character string may be determined by using a character string pre-stored on the memory 27 to be discussed below. In this case, the determination unit 23 derives a degree of similarity between the character string output from the recognition unit 22 and the character string stored on the memory 27. The determination unit 23 may determine as the attribute and type of the character string the attribute and type of a character string having the highest degree of similarity from among the character strings stored on the memory 27. The degree of similarity may be derived from Levenshtein distance. The Levenshtein distance is determined by counting the number of character replacements, character additions, and character deletions when any character string is changed into another character string.

The extraction unit 24 extracts the key character string corresponding to the value character string from the recognition results 33 by acquiring the position of the value character string from the recognition results 33 and by using the acquired position. Specifically, the extraction unit 24 extracts as a key character string a character string having the same attribute as the value character string and being in the vicinity of the value character string. For example, the character string in the vicinity refers to a character string positioned within a predetermined distance from the position of the value character string or a character string being closest in distance to the position of the value character string. For example, if "Taro Fuji" in FIG. 3 is acquired as the value character string, the extraction unit 24 extracts as the key character string "applicant name" having the same attribute as the value character string.

According to the first exemplary embodiment, the character string in the vicinity of the value character string is extracted as the key character string. The disclosure is not limited to this method. For example, a character string in a predetermined direction may be extracted as a key character string. For example, a character string positioned in a predetermined direction from the value character string, for example, positioned on the left-hand side of the value character string, may be extracted as the key character string. Referring to FIG. 5, the memory 27 described below may store a positional relationship database (hereinafter referred to as a "positional relationship DB") 34 that associates the attribute, key name, and positional relationship. The attribute is an attribute of a character string, the key name is a name of a key character string described in the document in the target image 31, and the positional relationship indicates a direction of the corresponding value character string from each key character string. The positional relationship DB 34 is an example of relation information.

Referring to FIG. 5, positional relationship "K-Right-V" in the application date indicates that, in the target image 31, the value character string "month, day, year" is positioned on the right-hand side of the key character string "application date". In other words, the positional relationship indicates that the key character string "application date" is positioned on the left-hand side of the value character string "month, day, year".

The extraction unit 24 acquires the positional relationship related to the value character string from the positional relationship DB 34 by using the attribute of the value character string extracted from the recognition results 33. The extraction unit 24 may acquire as the key character string a character string positioned in a direction opposite to the direction indicated by the acquired positional relationship with respect to the position of the value character string.

Figure 6:
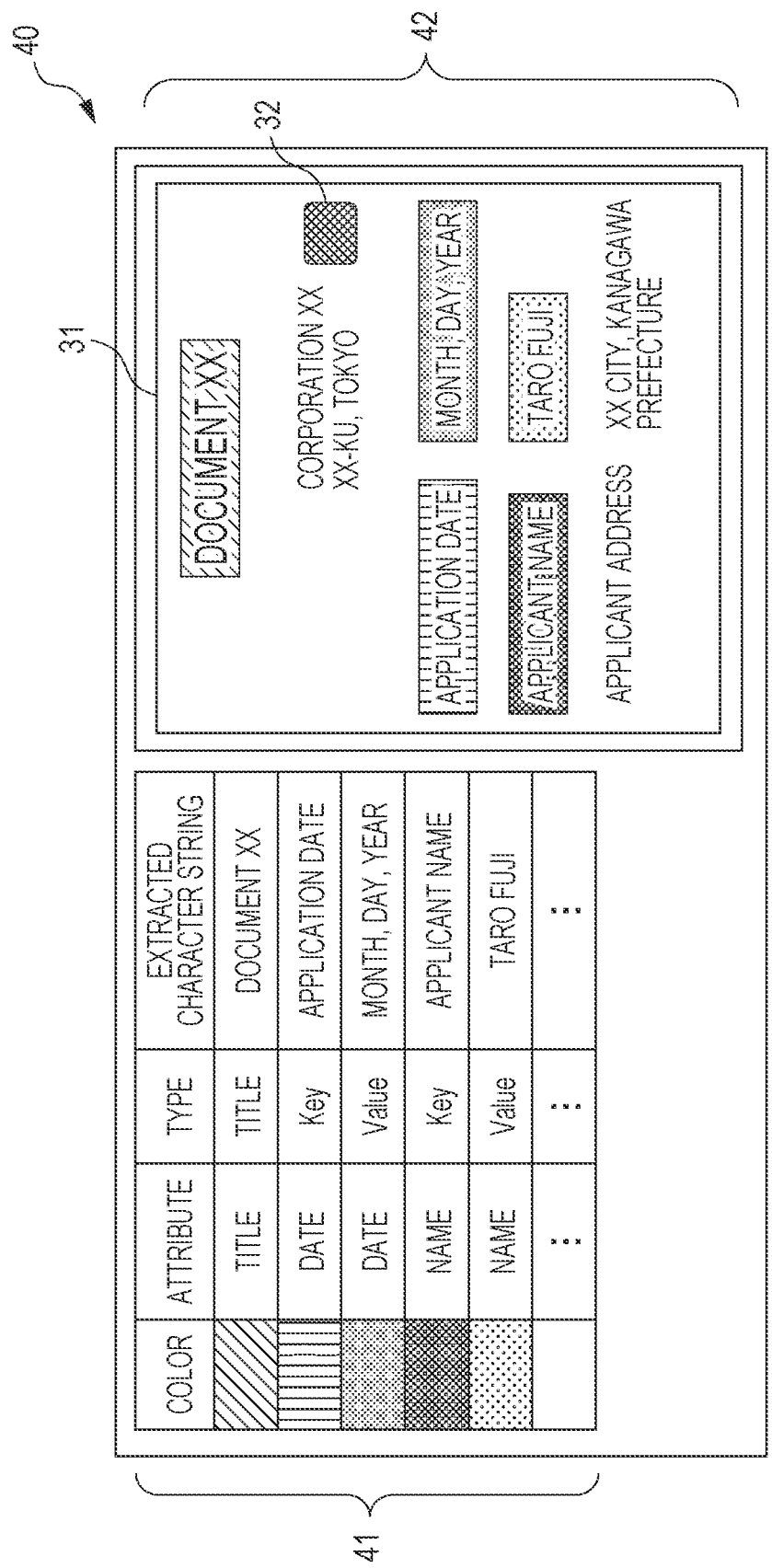
FIG. 6 illustrates an example of a confirmation correction screen that is used to specify a key character string and a value character string in accordance with each of the exemplary embodiments.

The confirmation correction unit 25 displays the character string, and the attribute, type, and position of the character string extracted from the target image 31 and receives a correction to the attribute, type, and position of the character string. For example, referring to FIG. 6, the confirmation correction unit 25 displays a confirmation correction screen 40. The confirmation correction screen 40 includes an extraction character string display region 41 and a target image display region 42. The confirmation correction unit 25 displays as an extracted character string a character string extracted by the extraction unit 24 in the extraction character string display region 41 and high-lights the position of a character string corresponding to the displayed character in the target image 31 in the target image display region 42.

After the extracted character string displayed in the extraction character string display region 41 is selected, the confirmation correction screen 40 accepts a correction to a character string that is extracted by specifying the position corresponding to the extracted character string in the target image display region 42 and a correction to the position of the character string in the target image 31. For example, after the "application date" is selected in the extraction character string display region 41, the user may specify a region where the "application date" is described. A correction to the key character string and the position of the key character string is ready to be accepted. In this case, a color column corresponding to the "application date" in the extraction character string display region 41 and the region of the application date in the target image display region 42 are high-lighted with the same color.

The output unit 26 outputs the key character string and value character string extracted from the target image 31.

The memory 27 stores, in association with each other, the target image 31, the character string extracted from the target image 31, and the position of the character string in the target image 31. The memory 27 also stores the positional relationship DB 34, the target image 31 having undergone extraction, and the character string in the target image 31 having undergone the extraction.

The learning unit 28A learns the determination unit 23 serving as a learning model. The learning unit 28A causes the determination unit 23 to learn with the target image 31 and character string being as input data and with the attribute and type of the character string being as teacher data.

In the above discussion, the determination unit 23 of the first exemplary embodiment learns with the character string being the input data and determines the attribute and type of the character string. The disclosure is not limited to this method. The position of the character string in the target image 31 may be treated as the input data. For example, using as the input data the position of the character string included in the recognition results 33 of the target image 31, the determination unit 23 may learn and determine the attribute and type of the character string.

The determination unit 23 may also determine the attribute and type of the character string by learning a relationship between the position of the character string in the target image 31 and the position of the object 32 in the target image 31. For example, if two terms "application address" and "applicant address" having the same attribute represented by the character string "address" in a document may indicate different addresses. The term "application address" does not have a key character string in the target image 31. However, positions of an entry item and the object 32 in the document are predetermined on a per document basis. The attribute and type of the character string may be identified based on the positional relationship between the object 32 and the character string in the target image 31. Specifically, the determination unit 23 may determine the attribute and type of the character string by learning as the input data the relationship between the position of the object 32 in the target image 31 and the position of the character string in the target image 31.

The determination unit 23 may determine the attribute and type of the character string by learning the positional relationship of the character strings as the input data or by learning as the input data the positional relationship included in the positional relationship DB 34 and the positions of the character strings. If the key character string corresponding to the value character string is not included in the target image 31, the determination unit 23 may set the determined attribute as the key character string or may determine the key character string corresponding to the value character string.

Figure 7:
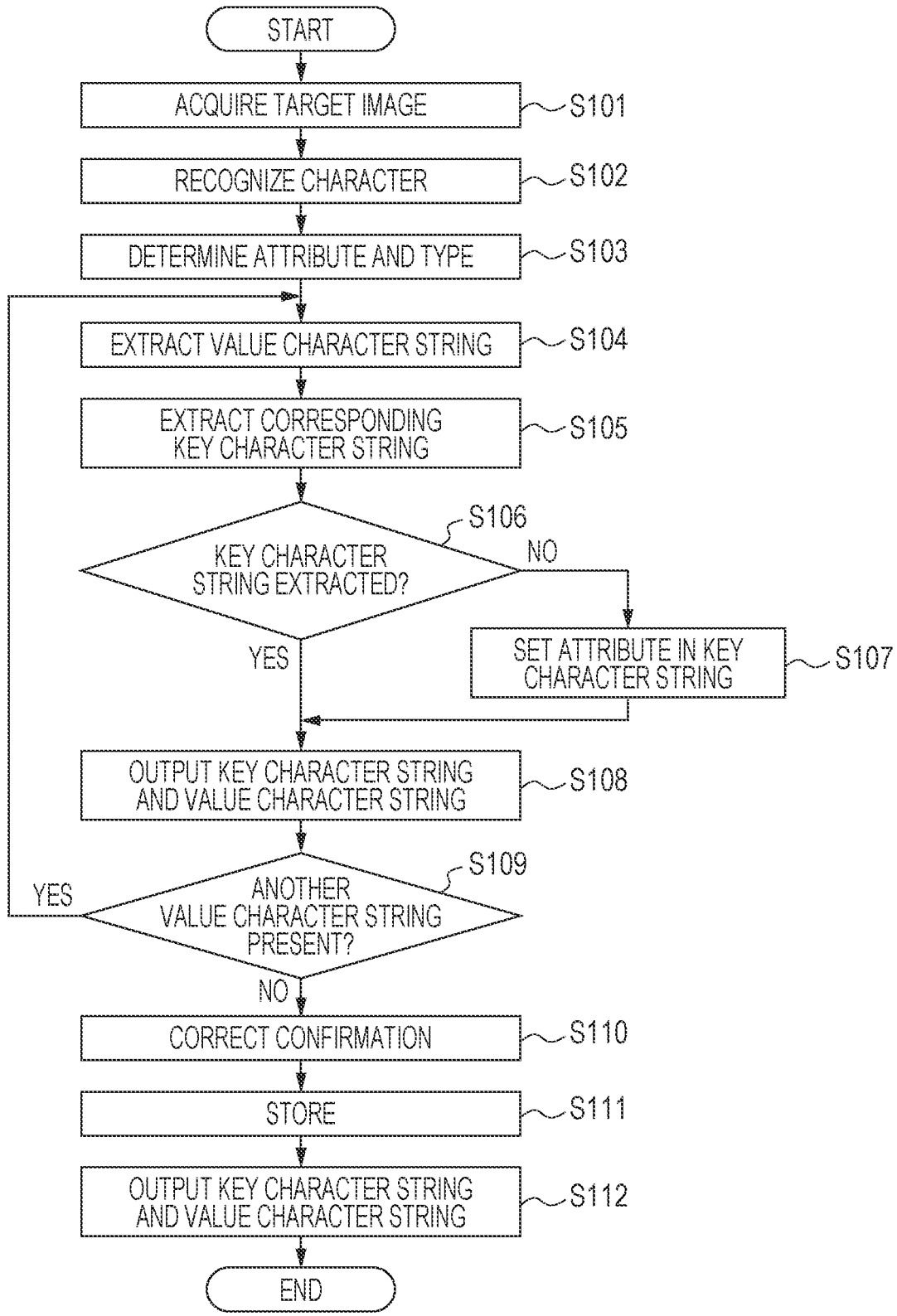
FIG. 7 is a flowchart illustrating an example of a extraction process to extract a character string in accordance with the first exemplary embodiment.

The process of the information processing apparatus 10 of the first exemplary embodiment is described with reference to FIG. 7. FIG. 7 is a flowchart illustrating an extraction process example to extract a character string in accordance with the first exemplary embodiment. The CPU 11 reads the information processing program from the ROM 12 or the storage 14 and executes the information processing program. The information processing program in FIG. 7 is thus executed. The information processing program in FIG. 7 is executed when the user inputs the target image 31 and an instruction to perform the extraction process.

In step S101, the CPU 11 acquires the target image 31 input by the user.

In step S102, the CPU 11 performs the OCR operation on the acquired target image 31 and outputs a character string and a position of the character string as the recognition results 33.

In step S103, the CPU 11 determines the attribute and type of the character string by using the recognition results 33 and outputs the determination results into the recognition results 33.

In step S104, the CPU 11 searches for and extracts the value character string on the recognition results 33.

In step S105, the CPU 11 identifies and extracts the key character string corresponding to the value character string by using the position and attribute of the extracted value character string.

In step S106, the CPU 11 determines whether the key character string has been extracted. If the key character string has been extracted (yes path in step S106), the CPU 11 proceeds to step S108. If the key character string is not extracted (no path in step S106), the CPU 11 proceeds to step S107.

In step S107, the CPU 11 sets the attribute of the value character string to be a key character string.

In step S108, the CPU 11 outputs as the extraction results the key character string and the value character string in association with each other.

In step S109, the CPU 11 determines whether another value character string is present. If the other value character string is present (yes path in step S109), the CPU 11 returns to step S104. If no other value character string is present (no path in step S109), the CPU 11 proceeds to step S110.

In step S110, the CPU 11 displays the confirmation correction screen and receives a user correction to the attribute, type, and position of the character string.

In step S111, the CPU 11 stores the target image 31, the attribute, type, and position of the character string in association with each other.

In step S112, the CPU 11 outputs the key character string and value character string in accordance with the extraction results.

As described above, according to the first exemplary embodiment, the key character string corresponding to the value character string is extracted by using the attribute of the character strings. The key and value extraction is thus performed. If a key character string is not extracted through the OCR operation or a key character string corresponding to the value character string is not included in the document, a key character string as a corresponding character string and the value character string are output.

Second Exemplary Embodiment

According to the first exemplary embodiment, if the key character string corresponding to the value character string is extracted from the recognition results 33, the key character string and the value character string are output in association with each other. According to a second exemplary embodiment, if the key character string corresponding to the value character string is not extracted from the recognition results 33, an image corresponding to the key character string is detected from the target image 31 and the key character string and the value character string are output in association with each other.

The hardware configuration of the information processing apparatus 10 of the second exemplary embodiment (see FIG. 1) is identical to the hardware configuration of the first exemplary embodiment. For example, the target image 31 (see FIG. 3), the recognition results 33 (see FIG. 4), and the positional relationship DB 34 (see FIG. 5) remain unchanged and the discussion thereof is omitted herein. The confirmation correction screen 40 (see FIG. 6) also remains unchanged from the first exemplary embodiment and the discussion thereof is also omitted herein.

Figure 8:
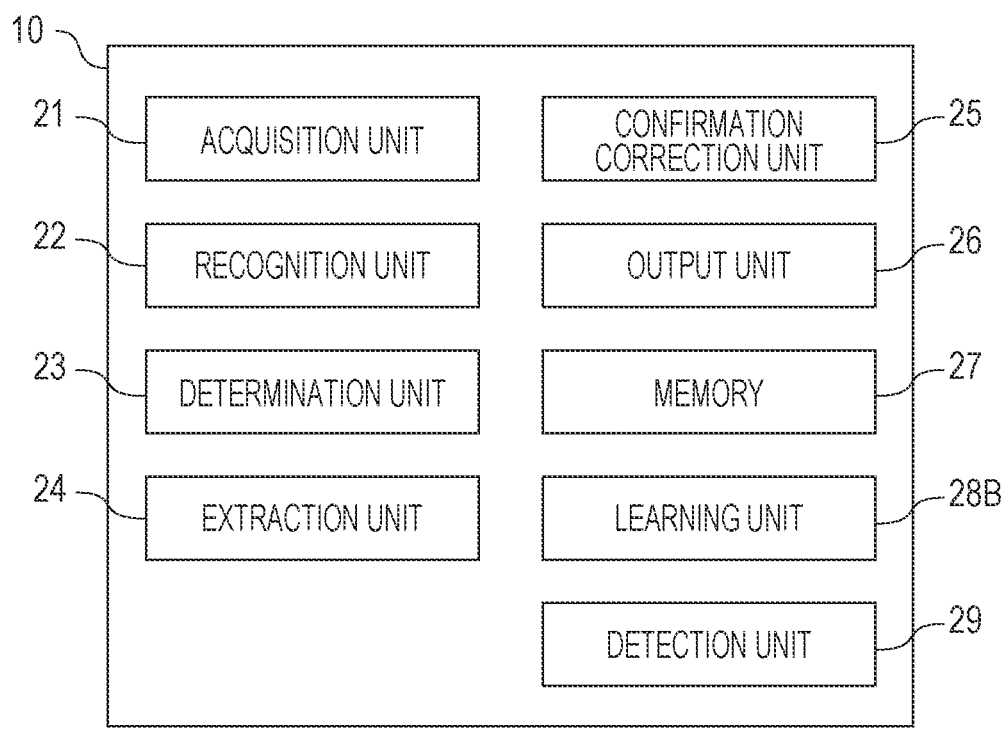
FIG. 8 is a block diagram illustrating a functional configuration example of the information processing apparatus of a second exemplary embodiment.

Referring to FIG. 8, the functional configuration of the information processing apparatus 10 is described below. FIG. 8 is a block diagram illustrating a functional configuration example of the information processing apparatus 10 of the second exemplary embodiment. In FIG. 8, functions of the information processing apparatus 10 identical to those of the information processing apparatus 10 in FIG. 2 are designated with the same reference numerals and the discussion thereof is omitted herein.

Referring to FIG. 8, the information processing apparatus 10 includes an acquisition unit 21, recognition unit 22, determination unit 23, extraction unit 24, confirmation correction unit 25, output unit 26, memory 27, learning unit 28B, and detection unit 29. By executing the information processing program, the CPU 11 functions as the acquisition unit 21, recognition unit 22, determination unit 23, extraction unit 24, confirmation correction unit 25, output unit 26, memory 27, learning unit 28B, and detection unit 29.

The learning unit 28B performs a learning process on the determination unit 23 as a learning model and the detection unit 29. The learning unit 28B causes the determination unit 23 to learn with the target image 31 and the character string being as the input data and with the attribute and type of the character string being as the teacher data. The learning unit 28B causes the detection unit 29 to learn with the target image 31 and the position of the character string being as the input data and with the key character string corresponding to the value character string being as the teacher data.

Via an object detection process, the detection unit 29 detects a key character string in the vicinity of the value character string specified in the target image 31. Specifically, the detection unit 29 is a learning model, such as convolution neural network (CNN) and you only look once (YOLO), which has performed machine learning to detect a character string in the vicinity of a specified character string. The detection unit 29 detects from the target image 31 an image of a key character string positioned in the value character string, acquires a key character string by identifying the detected image, and outputs the key character string to the determination unit 23.

The detection unit 29 of the second exemplary embodiment is a learning model using machine learning. The detection unit 29 detects from the target image 31 an image of the key character string positioned in the vicinity of the position of the value character string. The disclosure is not limited to this method. The image of the key character string positioned in the vicinity of the position of the value character string may be detected via a pattern matching operation. For example, each image corresponding to the key character strings may be stored beforehand and the image of a key character string may be detected via the pattern matching operation, such as shape detection or template matching. Also, the detection unit 29 may detect the key character string from the target image 31 by using the image corresponding to the key character string and identify the key character string positioned in the vicinity of the value character string.

Figure 9:
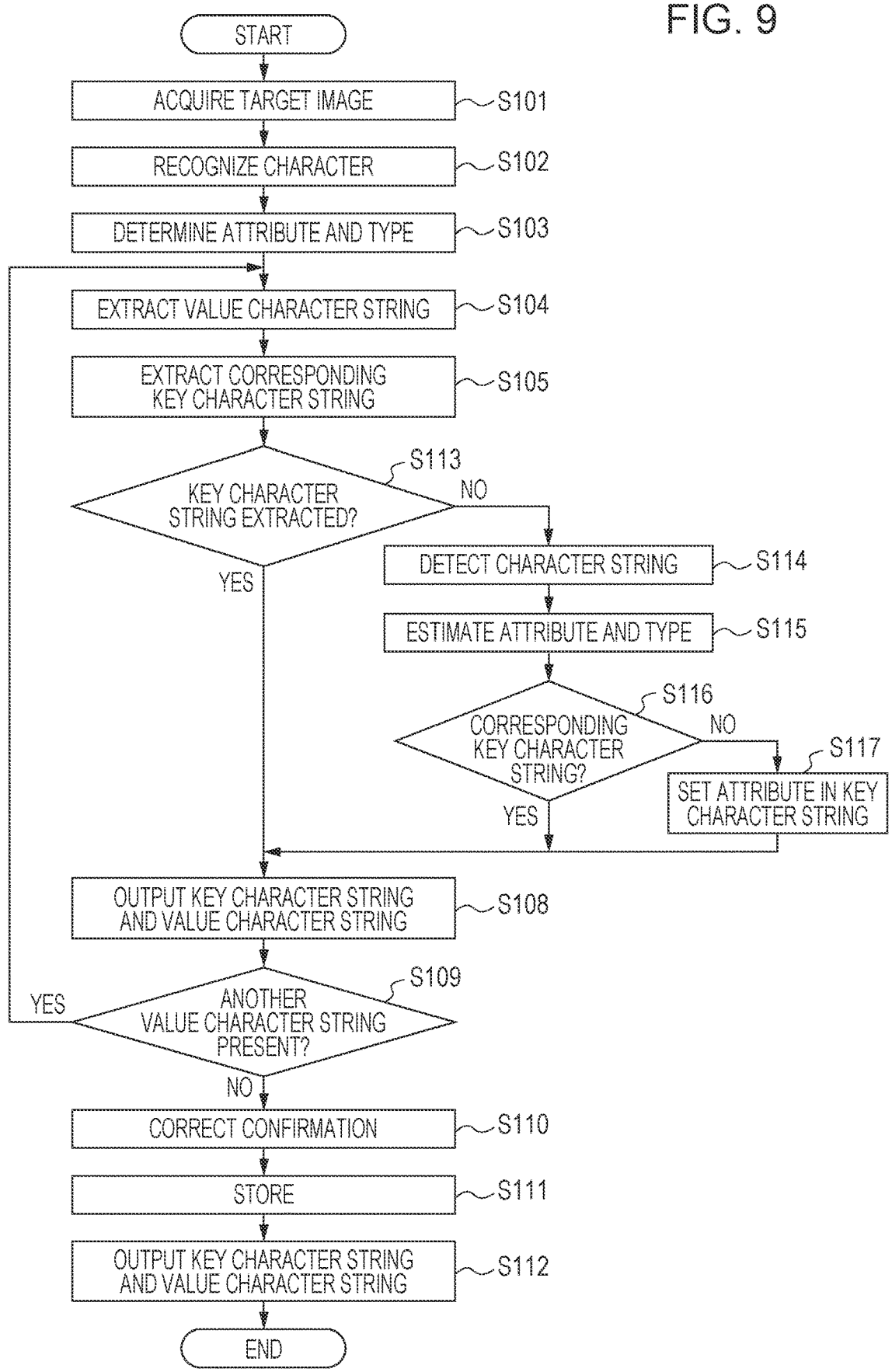
FIG. 9 is a flowchart illustrating an extraction process example to extract a character string in accordance with each of the exemplary embodiments.

The process of the information processing apparatus 10 of the second exemplary embodiment is described with reference to FIG. 9. FIG. 9 is a flowchart illustrating a extraction process example to extract a character string in accordance with the second exemplary embodiment. The CPU 11 reads the information processing program from the ROM 12 or the storage 14 and executes the information processing program. The information processing program in FIG. 9 is thus executed. The information processing program in FIG. 9 is executed when the user inputs the target image 31 and an instruction to perform the extraction process. In FIG. 9, steps identical to those in the extraction process in FIG. 7 are designated with the same reference numerals and the discussion thereof is omitted herein.

In step S113, the CPU 11 determines whether a key character string is extracted. If the key character string is extracted (yes path in step S113), the CPU 11 proceeds to step S108. If no key character string is extracted (no path in step S113), the CPU 11 proceeds to step S114.

In step S114, the CPU 11 performs a detection operation to detect a key character string in the target image 31 by using the position of the value character string and outputs the key character string as detection results. In the detection operation, the image of the key character string corresponding to the value character string is detected from the target image 31 and the key character string is acquired.

In step S115, the CPU 11 determines in response to detection results the attribute and type of the character string and outputs the attribute and type of the character string into the detection results.

In step S116, the CPU 11 determines whether the detected key character string corresponds to the value character string. If the detected key character string corresponds to the value character string (yes path in step S116), the CPU 11 proceeds to step S108. On the other hand, if the detected key character string does not correspond to the value character string (no path in step S116), the CPU 11 proceeds to step S117.

In step S117, the CPU 11 sets the attribute of the value character string to be the key character string.

As described above, the key and value extraction is performed by detecting the key character string corresponding to the value character string via the detection operation. Even when the key character string is not extracted via the OCR operation, a key character string as a corresponding character string and the value character string are output.

According to the second exemplary embodiment, the key character string is detected via the detection operation. Alternatively, the value character string may be detected.

According to the exemplary embodiments, a correction to the attribute, type, and position of the character string is received on the confirmation correction screen 40. The disclosure is not limited to this method. A correction to the extracted character string may be received. If a correction to the extracted character strings is received, the correction may be accepted with all the extracted character strings uniformly displayed. Alternatively, a degree of certainty indicating certainty of the character string may be derived. If the degree of certainty is lower than a predetermined threshold, for example, only a character string having certainty lower than the predetermined threshold may be displayed.

According to the exemplary embodiments, a correction to the position of the character string acquired from the recognition results 33 is accepted on the confirmation correction screen 40. The disclosure is not limited to this method. The position of the character string in the target image 31 may be specified.

According to the exemplary embodiments, a correction to the position of the character string is received in the confirmation correction. The disclosure is not limited to this method. When the target image 31 is input to the information processing apparatus 10, the designate of position of the character string may be received beforehand. Alternatively, the target image 31 stored on the memory 27 may be displayed at any time point after the output of the character string, and then a correction to the position of the character string may be received.

According to the exemplary embodiments, a correction to the character string is received on the confirmation correction screen 40. The disclosure is not limited to this method. The extracted character string may be corrected by using the character string stored on the memory 27 or the character string extracted in the past. Multiple value character strings may be stored in association with each other on the memory 27 and a value character string associated with an extracted value character string may be searched for and displayed. For example, the value character string of "name" and value character string of "address" extracted in the past may be stored in association with each other on the memory 27. If the value character string of "name" is extracted, the extraction unit 24 may acquire from the memory 27 the value character string of "address" corresponding to the value character string of "name" and may display a substitute candidate for correction.

The extracted character string may be corrected by using a learning model based on machine learning. For example, the character string extracted from the target image 31 having undergone the extraction operation and the character string corrected in the past are stored on the memory 27. A correction unit (not illustrated) learns the target image 31 stored on the memory 27, the character string in the target image 31 and the character string corrected in the past. The correction unit may display a correction candidate of the extracted character string to correct the character string.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

According to the exemplary embodiments, the information processing program is installed on the storage. The disclosure is not limited to this method. The information processing program of the exemplary embodiments may be distributed in a recorded form on a computer readable recording medium, such as an optical disc, like a compact-disc read-only memory (CD-ROM) or digital versatile disc ROM (DVD-ROM). Alternatively, the information processing program may be distributed in a recorded form on a semiconductor memory, such as a universal serial bus (USB) or a memory card. The information processing program of the exemplary embodiments may be acquired from an external apparatus via a communication network, such as the communication I/F 17.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   acquire, from results of character recognition performed on a target image including character strings, attribute information indicating an attribute to which a key character string and a value character string belong, the key character string as a character string specified beforehand as a key and the value character string as a character string indicating a value corresponding to the key character string;
   acquire, by using the attribute information, positional relationship information indicating a positional relationship between the key character string and the value character string;
   acquire by using the attribute information the key character string corresponding to the value character string extracted from the results of the character recognition;
   detect, by using a detection model that has learned to detect a character string included in an image, the key character string in accordance with the positional relationship information and a position of the value character string extracted from the results of the character recognition if the key character string has not been detected from the result of character recognition; and
   output the key character string and the value character string corresponding to the key character string.

2. The information processing apparatus according to claim 1, wherein the processor comprises a determination model that has learned to determine an attribute to which a character string belongs, and
   wherein the processor is configured to, by using the determination model, determine an attribute of a character string included in the target image.

3. The information processing apparatus according to claim 2, wherein the processor is configured to:
   cause the determination model to learn beforehand a character string and an attribute of the learned character string; and
   determine an attribute of a character string extracted from the results of the character recognition.

4. The information processing apparatus according to claim 3,
   wherein the processor is configured to, if the key character string has not been detected from the results of the character recognition on the target image, extract the key character string by using the detection model.

5. The information processing apparatus according to claim 2, wherein the processor is configured to:
   acquire position information indicating a position of the character string in the target image;
   cause the determination model to learn beforehand a position of a character string in an image and an attribute of the character string whose position has been learned; and
   determine, by using a position of a character string extracted from the results of the character recognition, an attribute of the character string extracted from the results of the character recognition.

6. The information processing apparatus according to claim 5, wherein the processor is configured to:
   cause the determination model to learn a positional relationship between an object at a predetermined position in an image and a position of a character string in the image; and
   determine an attribute in accordance with the positional relationship between a position of an object in the target image and a position of the character string in the target image.

7. The information processing apparatus according to claim 6,
   wherein the processor is configured to, if the key character string has not been detected from the results of the character recognition on the target image, extract the key character string by using the detection model.

8. The information processing apparatus according to claim 5,
wherein the processor is configured to, if the key character string has not been detected from the results of the character recognition on the target image, extract the key character string by using the detection model.

9. The information processing apparatus according to claim 2,
wherein the processor is configured to, if the key character string has not been detected from the results of the character recognition on the target image, extract the key character string by using the detection model.

10. The information processing apparatus according to claim 1,
wherein the processor is configured to, if the key character string has not been detected from the results of the character recognition on the target image, extract the key character string by using the detection model.

11. The information processing apparatus according to claim 1, wherein the processor is configured to, by using a pre-stored value character string or a value character string corrected in past, correct the value character string extracted from the results of the character recognition and output the corrected value character string.

12. The information processing apparatus according to claim 11, wherein the processor is configured to, by using a correction model, correct the value character string extracted from the results of the character recognition, the correction model having learned the pre-stored value character string or the value character string corrected in past.

13. The information processing apparatus according to claim 1, wherein the processor is configured to, if the key character string corresponding to the value character string is not extracted, set the attribute information in the key character string and output the key character string with the attribute information and the value character string corresponding to the key character string.

14. The information processing apparatus according to claim 1, wherein the processor is configured to:
acquire relation information that associates the attribute information with the positional relationship information indicating the positional relationship between the key character string and the value character string; and
acquire the key character string corresponding to the value character string that has been extracted in accordance with the position of the value character string extracted from the results of the character recognition and the positional relationship information associated with the attribute information indicating the attribute of the value character string in the relation information.

15. A non-transitory computer readable medium storing a program causing a computer to execute a process for processing information, the process comprising:
acquiring, from results of character recognition performed on a target image including character strings, attribute information indicating an attribute to which a key character string and a value character string belong, the key character string as a character string specified beforehand as a key and the value character string as a character string indicating a value corresponding to the key character string;
acquiring, by using the attribute information, positional relationship information indicating a positional relationship between the key character string and the value character string;
acquiring by using the attribute information the key character string corresponding to the value character string extracted from the results of the character recognition;
a detecting, by using a detection model that has learned to detect a character string included in an image, the key character string in accordance with the positional relationship information and a position of the value character string extracted from the results of the character recognition if the key character string has not been detected from the result of character recognition; and
outputting the key character string and the value character string corresponding to the key character string.

* * * * *